United States Patent [19]

Blickle et al.

[11] Patent Number: 4,471,076

[45] Date of Patent: Sep. 11, 1984

[54] PROCESS FOR THE PREPARATION OF FLUOROCARBON POLYMERS CONTAINING CARBOXYL GROUPS, AND CERTAIN STARTING MATERIALS REQUIRED FOR THIS, AND THE FLUORO-SULFATO COMPOUNDS FORMED AS INTERMEDIATE PRODUCTS IN THE PROCESS

[75] Inventors: Peter Blickle, Kelkheim; Johannes Brandrup, Wiesbaden; Hans Millauer, Eschborn; Werner Schwertfeger, Langgöns; Günter Siegemund, Hofheim, all of Fed. Rep. of Germany

[73] Assignee: Hoechst Aktiengesellschaft, Fed. Rep. of Germany

[21] Appl. No.: 467,179

[22] Filed: Feb. 16, 1983

[30] Foreign Application Priority Data

Aug. 17, 1982 [DE] Fed. Rep. of Germany ....... 3230528
Feb. 27, 1982 [DE] Fed. Rep. of Germany ....... 3207142

[51] Int. Cl.$^3$ .......................... B01J 39/20; C08F 8/34
[52] U.S. Cl. ....................................... 521/33; 525/367
[58] Field of Search ........................... 525/367; 521/33

[56] References Cited

U.S. PATENT DOCUMENTS 3,528,954 9/1970 Carlson ............................... 526/247
3,882,093 5/1973 Cavanaugh et al. .................. 521/33
4,200,711 4/1980 Onoue et al. ........................ 525/387

OTHER PUBLICATIONS

Krespan, J. Fluorine Chem. 2:173–180 (1972/73).
Kirchmeier et al, Inorg. Chemistry, 12:2886 (1973), of record, pp. 2888–2890 only.
Inorganic Chemistry, vol. 12, No. 12 (1973) R. I. Kirchmeier et al.

*Primary Examiner*—Joseph L. Schofer
*Assistant Examiner*—Peter F. Kulkosky
*Attorney, Agent, or Firm*—Connolly and Hutz

[57] ABSTRACT

Substantially non-crosslinked fluorocarbon polymers containing carboxyl groups are prepared starting from non-crosslinked and in some cases new, fluorocarbon polymers in which the linear macromolecules carry side chains containing the end group —CHFX (X is F or $CF_3$). The starting polymers are first reacted with peroxodisulfuryl difluoride $FSO_2O$—$OSO_2F$ to give the corresponding fluorosulfato derivatives containing the side chain end groups.

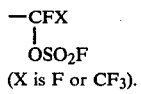

(X is F or $CF_3$).

In the event that X is F, these derivaties are then converted into the corresponding carboalkoxy derivatives by means of an alcohol, the fluorosulfato group being split off, and these carboalkoxy derivatives are then converted by saponification into the products containing the free carboxyl groups; the fluorosulfato derivatives can also be hydrolyzed with water, if appropriate in the presence of an inert solvent and/or bases, to give, without further treatment, the products containing the free carboxyl groups.

The fluorosulfato derivatives in which X is $CF_3$ in the side chain end groups are first decomposed in the presence of catalytic amounts of alkali metal fluorides and/or aprotic nitrogen bases to give the products containing the side chain end groups

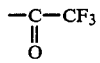

and the latter are then hydrolyzed to give the products containing the free carboxyl group.

Virtually non-crosslinked fluorocarbon polymers containing carboxyl groups are of industrial importance in the form of cation exchanger membranes in electrolytic cells, particularly in chlor-alkali electrolysis.

9 Claims, No Drawings

PROCESS FOR THE PREPARATION OF FLUOROCARBON POLYMERS CONTAINING CARBOXYL GROUPS, AND CERTAIN STARTING MATERIALS REQUIRED FOR THIS, AND THE FLUORO-SULFATO COMPOUNDS FORMED AS INTERMEDIATE PRODUCTS IN THE PROCESS

Non-crosslinked fluorocarbon polymers containing carboxyl groups are of industrial importance, principally in the form of cation exchange membranes in electrolytic cells, particularly for chloroalkali electrolysis.

The various known polymers of this type admittedly differ from one another structurally to a certain extent; a factor which is common to them in virtually all cases, however, is that they are composed of linear chain molecules which are perfluorinated throughout and contain side chains which are also perfluorinated and, if appropriate, interrupted by oxygen atoms and carry carboxyl groups. Such polymers and their preparation and properties are described in an exemplary manner in the article by Maomi Seko "Ion-Exchange Membrane for the Chlor-Alkali Process" (submitted at the 159th Meeting of the Electrochemical Society, Minneapolis, Minn., on May 13, 1981). The polymers described in that article are prepared by copolymerizing, for example, monomers of the formula

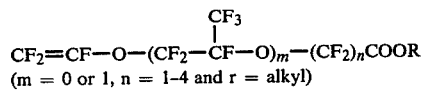

$(m = 0 \text{ or } 1, n = 1\text{-}4 \text{ and } r = \text{alkyl})$ with tetrafluoroethylene $CF_2=CF_2$. The polymers are then extruded and shaped and also subjected to a hydrolytic treatment in order to convert the ester groups into the carboxyl groups (in the free form or in the form of salts).

According to the article mentioned above, it is also possible to use, as monomers for the preparation of appropriate fluorocarbon polymers, perfluorinated vinyl compounds carrying, for example, $SO_2F$ groups in the molecule, such as, for instance:

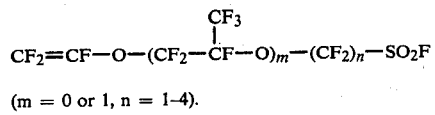

$(m = 0 \text{ or } 1, n = 1\text{-}4)$.

Polymers having $-CF_2-SO_2F$ groups in the side chains are then formed by homopolymerizing or copolymerizing these compounds. The $-CF_2-SO_2F$ groups can be hydrolyzed to give $-CF_2-SO_3H$ groups or can, for example, also undergo a functional change by reduction to give COOH groups. The latter—the functional change of $-CF_2-SO_2F$ or $-CF_2-SO_3H$ groups into COOH groups—is known, for example from U.S. Pat. No. 4,267,364.

The known non-crosslinked fluorocarbon polymers containing carboxyl groups are thus prepared throughout using as starting materials perfluorinated monomers which still contain a further functional group ($-COOR$, $SO_2F$ and the like) in the molecule. Since this second functional group must in most cases already be introduced at an early stage of the route of synthesis, account must be taken of its reactivity in all the subsequent stages; if necessary, the preservation of these groups must be ensured by using special measures, which constitutes a certain disadvantage of the known methods of synthesis.

There was, therefore, the object of preparing, while avoiding this disadvantage, fluorocarbon polymers which contain carboxyl groups and are as far as possible non-crosslinked—i.e. of not introducing the carboxyl group until as late a stage as possible of the whole route of synthesis.

It has been possible, in accordance with the invention, to achieve this object by introducing carboxyl groups into finished, non-crosslinked fluorocarbon polymers in which the linear macromolecules carry side chains containing the end group

—CHFX in which X is F or $CF_3$.

The invention relates, therefore, to a process for the preparation of virtually non-crosslinked fluorocarbon polymers containing carboxyl groups, which comprises the following reaction stages:

(a) reacting non-crosslinked fluorocarbon polymers in which the linear macromolecules carry side chains containing the end group

—CHFX in which X is F or $CF_3$, with peroxodisulfuryl difluoride $FSO_2O-OSO_2F$ to give the corresponding fluorosulfato derivatives containing the side chain end groups

in which X has the meaning indicated above and (b) reacting these fluorosulfato derivatives:
(b$_1$) in the event that X is F:
(b$_{11}$) with an alcohol of the formula ROH (R is $C_1$-$C_6$-alkyl, preferably methyl or ethyl) to give the corresponding esters containing the side chain end groups

—COOR (R is $C_1$ to $C_6$-alkyl, preferably methyl or ethyl), which are saponified to give the free carboxyl groups

—COOH, as such or in the form of a salt, or (b$_{12}$) with water, if appropriate in the presence of a solvent and/or bases, to give, without further treatment, the products containing, as side chain end groups, the carboxyl group

—COOH in the free form or in the form of a salt, and (b$_2$) in the event that X is $CF_3$:
(b$_{21}$) to give the corresponding ketones containing the side chain end groups

by decomposition in the presence of catalytic amounts of alkali metal fluorides and/or aprotic N bases, and ($b_{22}$) hydrolyzing the ketones to give the products containing, as side chain end groups, the carboxyl group

—COOH in the free form or in the form of a salt.

This process can be represented (diagrammatically) in terms of formulae as follows:

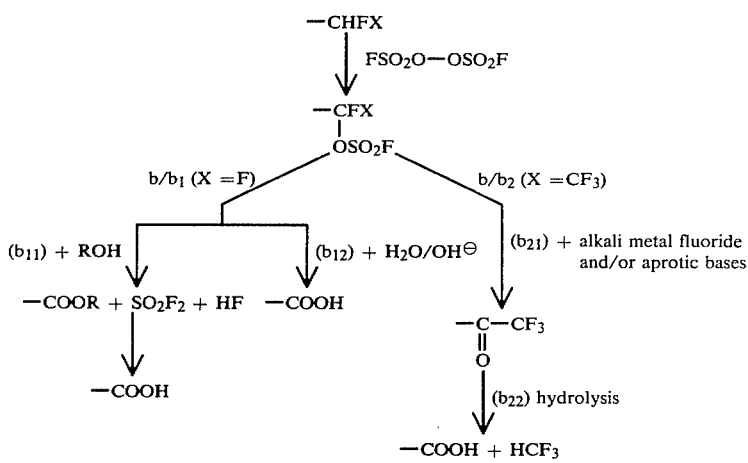

The process makes it possible to introduce functions into non-crosslinked fluorocarbon polymers containing no functional groups; since the —CHFX end groups of the side chains (X is F or $CF_3$) do not constitute functional groups. Because special and, in some cases, involved measures for preserving the functional groups in a series of stages of a synthesis are avoided, the process constitutes a considerable advance.

Surprisingly, when the non-crosslinked starting fluorocarbon polymers in which the linear macromolecules carry side chains containing the end group —CHFX (X is F or $CF_3$) are reacted with peroxodisulfuryl difluoride, no appreciable crosslinking of the linear macromolecules and their side chains takes place. This would not have been expected; admittedly it was known that monomeric, low-molecular, perfluorinated compounds which still contain C—H groups give the corresponding fluorosulfato compounds with peroxodisulfuryl difluoride. However, the copolymer formed from vinylidenefluoride $CF_2=CH_2$ and hexafluoropropylene $CF_3-CF=CF_2$ crosslinks under the influence of peroxodisulfuryl difluoride (cf. C. G. Krespan "Synthesis and Pyrolysis of Fluorosulfates" in J. Fluorine Chemistry 2 (1972/73), pages 173 et seq., in particular page 174). In the case of polymeric, perfluorinated compounds which still contain C—H groups, it would, therefore, have been expected that a considerable to complete crosslinking would take place under the action of peroxodisulfuryl difluoride.

The starting materials for the process according to the invention—i.e. non-crosslinked fluorocarbon polymers in which the linear macromolecules carry side chains containing the end group —CHFX (X is F or $CF_3$)—contain no further H atoms, apart from the H atoms in the said end group; some of them are known polymers, others are new polymers.

Polymers, in the side chain end groups —CHFX of which X is F are described, for example, in German Auslegeschrift No. 1,806,097 and in German Offenlegungsschrift No. 2,639,109. The starting monomers mentioned therein are, inter alia:

$CF_2=CF\ (CF_2)_n-CHF_2$ $CF_2=CF-O-(CF_2)_n-CHF_2$ $CF_2=CF-O-CF_2-CF-O-(CF_2)_n-CHF_2$
$\quad\quad\quad\quad\quad\quad\quad\quad\quad |$
$\quad\quad\quad\quad\quad\quad\quad\quad CF_3$ (n=0 or 1-10) etc.

The preparation of, for example, the compound $CF_2=CF-O-(CF_2)_6-CHF_2$ is described in J. Org. Chem. Volume 42, No. 25 (1977), pages 4055-58, in particular page 4057; the other vinyl ethers containing the —$CHF_2$ end group which are suitable here can, in principle, also be obtained by this method.

Preferred non-crosslinked fluorocarbon polymers in which X is $CF_3$ in the side chain end group are those which are obtained by homopolymerizing or copolymerizing the vinyl ethers of the formula below:

$CF_2=CF-O-CF_2-(CF-O-CF_2)_{\overline{n}}CF_2-CHF-CF_3$
$\quad\quad\quad\quad\quad\quad\quad |$
$\quad\quad\quad\quad\quad\quad CF_3$ (n = 0-5)

The preparation of these vinyl ethers is advantageously effected in accordance with the process of patent application No. P 3,207,143.4 (HOE 82/F 035), which was filed on the same date, by:

(a) reacting 3—H-perfluorobutyryl fluoride $FOC-CF_2-CHF-CF_3$ with hexafluoropropene epoxide

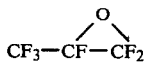

in the presence of at least one ionic fluoride as catalyst and of an inert aprotic-polar solvent, at a temperature between about −30 and about +100° C., preferably between about 0 and about +50° C., to give the following acid fluoride

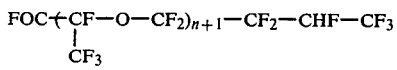

(b) pyrolyzing this acid fluoride, as such or after conversion into the corresponding alkali metal carboxylate, at a temperature between about 100° and about 600° C., and (c) isolating the vinyl ether formed in the pyrolysis.

The homopolymerization or copolymerization (preferably with $CF_2=CF_2$) of these vinyl ethers can be effected by known procedures, such as are, for example, described in German Auslegeschrift No. 1,806,097 and German Offenlegungsschrift No. 2,639,109.

The copolymerization can, in particular, be effected by the process described in German Auslegeschrift No. 1,806,097, in a liquid Cl—F-alkane solvent in the presence of a low-temperature initiator, such as, for example, bis-(perfluoropropionyl) peroxide, at temperatures of about 30°–90° C. and low pressures. The copolymerization can, however, also be carried out, preferably as an emulsion polymerization, in an aqueous medium in the presence of emulsifiers and buffer substances and of initiators which form free radicals, as described in German Offenlegungsschrift No. 2,639,109, but it is possible, if desired, to dispense with the chain transfer agent.

All in all, non-crosslinked starting fluorocarbon polymers which are preferred for the process according to the invention are polymers containing recurring units of the formula (A)

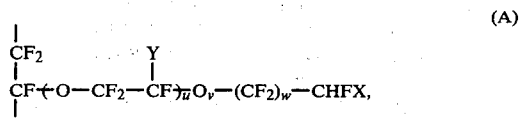

in which
u is 0,1 or 2,
v is 0 or 1,
w is 1–7 and
X and Y independently of one another are F or $CF_3$, on their own or together with other recurring units of the formula (B)

$$-CF_2-CFZ- \qquad (B)$$

in which Z is Cl, F, $R_f$ or $-OR_f$ ($R_f$ is $CF_3$ or a $C_2$–$C_8$-perfluoroalkyl radical which is optionally interrupted by 0 atoms).

In the structural units mentioned above, particularly preferentially:
u is 0 or 1,
v is 1,
w is 1–5, especially 2–5,
X is F
Y is $CF_3$ and Z is F, $CF_3$, $-O-CF_2-CF_2-CF_3$ or

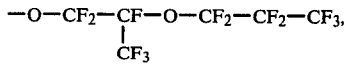

in particular only F.

If the structural units carrying the side chain end groups —CHFX are not present exclusively in the polymer (i.e., if the latter is not a homopolymer), the ratio of these structural units to the structural units —CF$_2$—CFZ is preferably about 1:(2 to 20), in particular about 1:(2–8). The copolymers of this composition are new compounds. Amongst the latter, preferred copolymers are, in turn, the bipolymers containing units (A) and units —CF$_2$—CF$_2$— as (B), and also the terpolymers containing units (A) and, as (B), units —CF$_2$—CF$_2$— and —CF$_2$—CFZ— in which Z has the abovementioned meaning excluding F.

Copolymers which are particularly preferred are bipolymers containing, in the abovementioned molar ratios, units A and units —CF$_2$—CF$_2$—, i.e. copolymers of tetrafluoroethylene.

The new copolymers are particularly suitable as starting materials for the process according to the invention because they produce, in the end products, the optimum number of carboxyl groups for cation exchangers.

The introduction of functional groups into the starting fluorocarbon polymers containing the side chain end groups —CHFX begins with the reaction stage a, which is most fundamental for the process according to the invention: the reaction with peroxodisulfuryl difluoride.

For this reaction, it is possible to employ the starting fluorocarbon polymer in the form of shaped structures such as, for example, films; if films are employed, a film thickness of about 5 to 300μ is preferred. In order to make it possible for the peroxodisulfuryl difluoride to permeate the polymer even more rapidly, it is more advantageous to employ the latter in the form of powder; an advantageous particle size for the powder is between about 2 and 100μ, preferably about 5 to 50μ.

Peroxodisulfuryl difluoride can be prepared by known methods, such as, for example, those described by F. B. Dundley in J.Chem.Soc.1963, pages 3407 to 3411. Thus purely chemical methods as well as electrochemical methods are suitable for its preparation.

Examples of purely chemical methods are the direct reaction of $SO_3$ with fluorine using $Ag_2F_2$ as catalyst, or the oxidation of metal fluorosulfonates with fluorine.

A suitable electrochemical method is, above all, the anodic oxidation of solutions of alkali metal fluorosulfonates in fluorosulfonic acid. The peroxodisulfuryl difluoride prepared by this electrochemical method is also the product which is preferably used for the process according to the invention.

Both "in-cell" and "ex-cell" processes are possible for the reaction of the starting fluorocarbon polymer with the electrochemically prepared peroxide.

"In-cell" denotes that the polymer to be reacted is present in the electrolyte in the electrochemical cell.

"Ex-cell" on the other hand means that the polymer is present in a second vessel or reactor into which the electrolyte containing peroxide is introduced, for example by circulatory pumping. It is also possible to carry out "ex-cell" reactions in which the polymer and the peroxide are reacted with one another in another diluent after the peroxide has been isolated from the electrolyzed fluorosulfonic acid; examples of diluents of this type are perfluoroalkanes, perfluorinated ethers, $N(C_4F_9)_3$ and perfluoroalkanes containing fluorosulfato groups.

Electrochemical cells in the form of a pot or trough are suitable for carrying out the "in-cell" processes and for preparing the peroxide required for "ex-cell" processes. The electrochemical cells can be divided or undivided cells, the undivided form generally being completely adequate. Against its simpler and cheaper construction must, of course, be set a slightly lower current yield, caused by the cathodic reduction of the peroxodisulfuryl difluoride.

In a divided cell, it is possible to use, for example, glass frits or porous polytetrafluoroethylene as the diaphragm.

The materials which are known for electrochemical production are suitable as the electrode materials.

Examples of suitable anode materials are, therefore, platinum and alloys of platinum with the platinum group and/or vitreous carbon; amongst these, a preferred anode material is vitreous carbon.

The anode materials mentioned are also suitable as cathode materials; in addition other metals and metal alloys, preferably stainless steels, can be used. The preferred cathode material—as also the preferred anode material—is vitreous carbon.

The electrolyte is composed of fluorosulfonic acid in which a salt of fluorosulfonic acid has been dissolved in order to improve its electrical conductivity. The alkali metal fluorosulfonates are particularly preferred conducting salts of this type. Such electrolytes are prepared by processes which are known per se.

In the process according to the invention it is preferable to carry out reaction stage (a) using electrochemically prepared peroxodisulfuryl difluoride in the "in-cell" process by electrolyzing the non-crosslinked starting fluorocarbon polymer containing the side chain end groups —CHFX (X is F or $CF_3$) in an electrolyte composed of fluorosulfonic acid and an alkali metal fluorosulfonate using platinum, alloys of platinum with metals of the platinum group and/or vitreous carbon as anode materials and using cathode materials which are customary, but are stable under the conditions of electrolysis.

The reaction temperature can be selected within a fairly wide range—between about $-10°$ and about $+80°$ C.; preferably, however, it is between about $5°$ and about $30°$ C.

Although sub-atmospheric or super-atmospheric pressure is possible in principle, normal pressure is preferred, if only for reasons of economy.

The current densities used are generally between about 2 and 200 $mA.cm^{-2}$, preferably between about 30 and 100 $mA.cm^{-2}$, relative to the anode. The cathode current density is selected at a value about 2 to 30 times as high, which can be achieved by making the surface of the cathode correspondingly smaller. The purpose of this is to repress the diffusion-controlled cathodic reduction of the peroxodisulfuryl difluoride in an undivided cell.

Concentration of peroxodisulfuryl difluoride between about 0.1 and about 2.5 $moles.l^{-1}$ can be set up in this manner.

The highest possible peroxide concentrations are, of course, advantageous for achieving a rapid reaction with the polymer. The peroxide concentration is monitored by methods which are known per se for this purpose, such as, for example, iodometry.

The time for the reaction between the peroxodisulfuryl difluoride and the polymer is generally between about 1 and about 100 hours, preferably between about 10 and about 70 hours.

In the "ex-cell" process the peroxodisulfuryl difluoride is prepared analogously to the method described in the "in-cell" process. The reaction with the polymer is, however, then carried out in another reaction vessel. The peroxodisulfuryl difluoride can then either remain in the electrolyte liquid—the reaction then takes place in the same medium as in the "in-cell" process—or the peroxodisulfuryl difluoride is isolated from the electrolyte by customary methods (such as, for example, by distillation) and mixed with one of the fluorinated solvents mentioned above. An approximately 3-molar to 5-molar solution of peroxodisulfuryl difluoride is preferred for this; it is also possible, however, to keep the proportion of solvent even lower or to dispense with the solvent altogether.

It is preferable, however, to employ the peroxodisulfuryl difluoride in solution.

When the reaction of the polymer with the peroxodisulfuryl difluoride is complete, working up can, in principle, be carried out in the same manner in the "in-cell" process as in the "ex-cell" process.

For this purpose, the liquid phase is first separated from the polymer, which can be effected by methods known for this purpose (for example removal by distillation, filtration or decanting). Electrolytic phases which have been separated off in this manner can be re-used for a further batch without difficulty, as can also fluorosulfonic acid which has been recovered by distillation.

In order to remove fluorosulfonic acid and, if necessary, solvents adhering to the polymer, the latter is dried, for example in a stream of inert gas or under reduced pressure.

Polymers carrying fluorosulfato groups in the side chains are obtained in this manner. The conversion, i.e. the number of fluorosulfato groups introduced, relative to the number of hydrogen atoms initially present, can be varied within wide limits; it is normally between about 10 and about 98%, preferably between about 80 and 98%. If all the side chain end groups —CHFX in the starting polymers are not fluorosulfated, a fraction of the said side chain end groups in the polymer of course remains unaltered, but this does not, as might be expected, interfere with further processing in any way.

The virtually non-crosslinked fluorocarbon polymers containing the side chain end groups

(X is F or $CF_3$) which are obtained in stage (a) of the process according to the invention are new compounds.

They can be processed further without difficulty in accordance with reaction stage (b) of the process according to the invention to give the corresponding fluorocarbon polymers carrying carboxyl groups. The methods used here are at least in part known per se.

In case (b$_1$)—i.e. if X is F in the end groups of the fluorosulfato compounds—further processing is effected (b₁₁) using an alcohol of the formula ROH (R=C₁-C₆-alkyl)—preferably methanol or ethanol. This is advantageously effected by suspending the polymer in the form of powder in the alcohol by stirring, then heating it in this suspension to an elevated temperature—preferably to about 80°-180° C.—and then isolating it and drying it. The fluorosulfato groups are converted by this means into the carboalkoxy groups —COOR.

However, it is also possible to remove fluorosulfonic acid from the polymer while it is still moist by washing it with concentrated sulfuric acid. This can then be followed by one of more washings with a suitable solvent, for example a fluorinated hydrocarbon, to which further quantities of an alcohol ROH are added successively at each washing. Finally, as described above, the powder is stirred up in pure alcohol and heated and is then isolated and dried.

In the case of low-boiling alcohols, the treatment is carried out at an elevated temperature, if necessary in a pressure-resistant vessel.

The polymers containing the ester groups thus formed as side chain end groups are then subjected to an acid or alkaline saponification in a customary manner in order to convert the esters into the free carboxyl groups. The free carboxyl groups are formed in acid saponification, while in alkaline saponification the carboxyl groups are produced in the form of a salt.

(b₁₂) The —CF₂OSO₂F groups in the fluorosulfato compounds obtained in reaction stage (a) of the process according to the invention can also be directly converted into the carboxyl groups in the free form or in the form of a salt by means of water, if appropriate in the presence of a solvent and/or bases. This can be effected in a very simple manner, for example by stirring the fluorosulfato product in water and subsequently isolating it and drying it. Solvents, such as, for example, alcohols or ethers, and/or bases, such as, for example, alkali metal hydroxide solutions, can be present in this reaction. The carboxyl group is then produced in the form of a salt, depending on the amount of bases present.

Here too, in order to split off the fluorosulfato groups completely, if necessary, it is advantageous to heat the polymer in water to an elevated temperature—preferably about 80° to about 180° C.

(b₂) If X is CF₃ in the side chain end groups of the fluorosulfato compounds formed in reaction stage (a) of the process according to the invention, (b₂₁) the side chain end groups

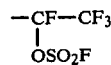

are converted into the corresponding ketone groups

by decomposition in the presence of catalytic amounts of alkali metal fluorides and/or aprotic nitrogen bases. This process stage corresponds to the method described in Patent Application No. P 3,034,491.3 (HOE 80/F 198).

Examples of aprotic nitrogen bases which can be used here are triethylamine, 1,4-diazabicyclo[2.2.0]octane or 1,8-diazabicyclo[5.4.0]undec-7-ene. The catalyst is preferably employed in an amount of about 1 to 50 mole % relative to the fluorosulfato compound to be decomposed.

Depending on the catalyst used, the reaction temperatures are between about −40° and +120° C.

This reaction is preferably carried out in inert, aprotic solvents, such as, for example, ethers or nitriles.

It is also possible to carry out the reaction either under normal pressure or under an excess pressure.

(b₂₂) The polymers containing the side chain end groups

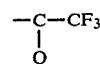

formed in process stage (b₂₁) described above are then converted into the products containing carboxyl groups in the free form or the form of a salt in a manner which is known per se, by hydrolysis, preferably in a strongly basic medium.

Because the introduction of functional groups into appropriate non-crosslinked fluorocarbon polymers is only effected subsequently and is effected without appreciable crosslinking taking place, the process according to the invention constitutes a route to fluorocarbon polymers containing carboxyl groups which is advantageous and represents an advance. This route is made possible via the fluorosulfato compounds formed in the course thereof as intermediate products.

The invention will now be illustrated in greater detail by means of the following examples.

PROCESS ACCORDING TO THE INVENTION

EXAMPLE 1

(a) The electrolysis cell comprises a laboratory scale glass cylindrical cell of diameter 110 mm and height 250 mm, equipped with a cooling jacket. The base of the vessel is formed by the plate-shaped anode composed of vitreous carbon, 3 mm thick. A magnetic stirrer bar encased in PTFE (=polytetrafluoroethylene) runs on this anode. The cathode is formed by a rod of vitreous carbon, 4 mm thick, which hangs centrally in the cell, fastened to the lid and stops approx. 40 mm above the anode. Down to the bottom length of 35 mm, which remains free, the cathode rod is encased in PTFE tubing. The resulting ratio of anode/cathode surface is approx. 21.

The electrolyte is prepared by adding 1,400 g of freshly distilled fluorosulfonic acid to 29.2 g (0.5 mole) of powdered sodium chloride, and the hydrogen chloride formed is stripped off continuously by means of dry nitrogen gas.

150 g of finely powdered copolymer formed from 90 mole % of tetrafluoroethylene and 10 mole % of ω-H-perfluoro-(propyl vinyl ether) H(CF₂)₃—OCF═CF₂ are added to this solution and are kept in suspension by stirring. Electrolysis is then carried out for 40 hours at 5 A and a temperature of 10°-15° C., the cell voltage being approx. 15 V. When the electrolysis is complete, the electrolyte is suction-drained from the polymer powder through a glass frit and the powder is then dried in a 250 ml round-bottomed flask under an oil pump vacuum.

($b_1$) Powder thus obtained is then heated for 8 hours in 500 ml of anhydrous methanol at 130° C. under the autogenous pressure of the methanol (approx. 6 bar) in a 2 liter chrome-nickel steel autoclave. After cooling, the powder is separated off from the methanol and dried in a water pump vacuum. It can be seen from the vibrational spectrum of thin wafers, compression-molded from this powder, that, besides the newly formed carbomethoxy groups, no $CF_2H$ or fluorosulfato groups are still present.

The carbomethoxy groups are saponified in the customary manner.

EXAMPLE 2

(a) The electrolysis cell and electrolyte system used are as described in Example 1.

1,500 g of electrolyte are electrolyzed for 40 hours at 5 A and a temperature of approx. 10°-20° C., without the addition of polymer powder, the cell voltage being approx. 15 V. The electrolyte is then about 1-molar in peroxodisulfuryl difluoride, as determined by iodometry, and 150 g of finely powdered copolymer formed from 75 mole % of tetrafluoroethylene and 25 mole % of ω-H-perfluoro-(propyl vinyl ether) are added. The mixture is stirred vigorously at 25° C. for 5 hours and is then filtered through a glass frit, and the filter cake is washed with 500 ml of concentrated sulfuric acid. This is followed by two washings with trifluorotrichloroethane (Frigen 113 made by Hoechst AG), 10% by volume of methanol being added at the first wash and 30% by volume at the second wash.

($b_1$) The powder is then suspended in 500 ml of methanol to which 15 g of triethylamine are added, and is heated for 8 hours at 130° C. under the autogenous pressure of the methanol in a 2-liter chrome-nickel steel autoclave. After cooling, the powder is separated off from the liquid and dried in vacuo. The infrared spectrum of the product shows that the polymer side chains are now virtually completely substituted by triethylammonium carboxylate groups. The equivalent weight of this polymer is approx. 590.

EXAMPLE 3

(a) 10 g of copolymer formed from 85 mole % of tetrafluoroethylene and 15 mole % of ω-H-perfluoro-(propyl vinyl ether) are suspended in 90 ml of perfluoro-(2-ethoxy-3,6-dimethyl-1,4-dioxane) (boiling point 87° C.) in a 250 ml round-bottomed flask. 18 g (0.09 mole) of freshly distilled peroxodisulfuryl difluoride (boiling point 65° C.; 99.5% strength as determined by iodometry) are added dropwise at 20° C. in the course of 30 minutes, while stirring. The suspension is then stirred for a further 4 hours at approx. 25° C. and is then filtered through a glass frit, and the resulting powder is dried under reduced pressure. In the IR spectrum of a thin wafer, compression-molded from this powder, it is found, from the disappearance of the C—H vibrations of the starting polymer (3,000 $cm^{-1}$ C—H stretching vibration; 1405 $cm^{-1}$ C—H deformation) and from the appearance of the S=O stretching vibration (1495 $cm^{-1}$) typical of perfluoroalkylfluorosulfates, that the substitution has taken place virtually completely.

STARTING POLYMERS ACCORDING TO THE INVENTION

EXAMPLE 4

2,500 ml of Frigen F 113 and 800 g of ω-H-perfluoropropyl vinyl ether $HCF_2—CF_2—CF_2—O—CF=CF_2$ are placed in a 4,000 ml enamelled kettle, equipped with a paddle stirrer. The vessel is flushed three times with nitrogen and three times with tetrafluoroethylene $CF_2=CF_2$, tetrafluoroethylene is injected to a pressure of 4 bar and the reaction is started at 40° C. by means of 1.5 g of bis-perfluoropropionyl peroxide. 700 g of tetrafluoroethylene are then introduced in the course of 90 minutes at a constant temperature and pressure. After removing the excess ether and solvent by evaporation, 990 g of polymer having an ether content of 29.2% by weight=15.1 mole % (determined via the kettle balance) are obtained. The polymer has a melt index value of 4 g/10 minutes at 250° C. and a loading of 5 kg.

EXAMPLE 5

2,000 ml of Frigen F 113 and 1,200 g of ω-H-perfluoropropyl vinyl ether are put into a 4,000 ml enamelled kettle, equipped with a paddle stirrer. The vessel is flushed 3 times with nitrogen and 3 times with tetrafluoroethylene, tetrafluoroethylene is injected to a pressure of 4 bar and the reaction is started at 40° C. by means of 2 g of bis-perfluoropropionyl peroxide. 550 g of tetrafluoroethylene are then introduced in the course of 120 minutes at a constant temperature and pressure. After removing the excess ether and solvent by evaporation, 970 g of polymer having an ether content of 43.3% by weight=24.8 mole % (determined from the kettle balance) are obtained. The polymer has a melt index value of 220 g/10 minutes at 250° C. and a loading of 5 kg.

EXAMPLE 6

The procedure is analogous to that of Example 4; however, 800 g of ω-H-perfluoropentyl vinyl ether are employed instead of 800 g of ω-H-perfluoropropyl vinyl ether. After removing excess ether and solvent by evaporation, 1,260 g of polymer having an ether content of 44.4% by weight=19.4 mole % (determined from the kettle balance) are obtained. The polymer has a melt index value of 145 g/10 minutes at 250° C. and a loading of 5 kg.

EXAMPLE 7

2,700 ml of Frigen F 113 and 600 g of 2-(3-hydroperfluoro-n-butoxy)-perfluoropropyl vinyl ether are placed in a 4000 ml enamelled kettle, equipped with a paddle stirrer. The vessel is flushed three times with nitrogen and three times with tetrafluoroethylene, tetrafluoroethylene is injected to a pressure of 4 bar and the reaction is started at 40° C. by means of 1.5 g of bis-perfluoropropionyl peroxide. 550 g of tetrafluoroethylene are then introduced in the course of 60 minutes at a constant temperature and pressure. After removing excess ether and solvent by evaporation, 1,030 g of polymer having an ether content of 46.6% by weight=15.8 mole % (determined from the kettle balance) are obtained. The polymer has a melt index value of 2 g/10 minutes at 250° C. and a loading of 5 kg.

We claim:
1. A process for the preparation of a fluorocarbon polymer containing carboxyl groups which comprises the following reaction stages:
   (a) reacting essentially non-crosslinked fluorocarbon polymers in which the linear macromolecules of said non-crosslinked fluorocarbon polymers carry side chains containing the side-chain end group

—CHFX in which X is F or CF$_3$, said linear macromolecules containing, apart from the H-atoms in said end group, no further H atoms,
with peroxodisulfuryl difluoride, FSO$_2$O—OSO$_2$F, to give the corresponding essentially non-crosslinked fluorocarbon polymers containing fluorosulfato derivative side-chain end groups of the formula

wherein X is as defined perviously; and (b) reacting these fluorosulfato derivative side-chain end groups:
 (b$_1$) in the event that X is F:
  (b$_{11}$) with an alcohol of the formula ROH, wherein R is C$_1$-C$_6$-alkyl, to give the corresponding essentially non-crosslinked fluorocarbon polymers containing the side-chain end groups —COOR, R being defined above, which side-chain end groups are saponified to give the corresponding free carboxylic acid group or a salt thereof; or
  (b$_{12}$) with water to give, without further treatment, essentially non-crosslinked fluorocarbon products containing, as side chain end groups, carboxylic acid groups or a salt thereof; and
 (b$_2$) in the event that X is CF$_3$:
  (b$_{21}$) to give the corresponding essentially non-crosslinked fluorocarbon polymers containing the side-chain end groups

by decomposition in the presence of catalytic amounts of an alkali metal fluoride or an aprotic nitrogen base; and
  (b$_{22}$) hydrolyzing the side-chain and groups of said stage (b$_{21}$) to give the essentially non-crosslinked fluorocarbon polymers containing, as the side-chain end groups, carboxylic acid groups or a salt thereof.

2. The process as claimed in claim 1, wherein said non-crosslinked starting fluorocarbon polymers in which the macromolecules carry side chains containing the end group

—CHFX in which X is F or CF$_3$, are polymers recurring units of the formula (A)

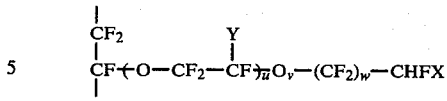

in which u is 0, 1 or 2,
 v is 0 or 1,
 w is 1-7 and
 X and Y independently of one another are F or CF$_3$, on their own or together with other recurring units of the formula (B)

in which Z is Cl, F, R$_f$ or —OR$_f$, R$_f$ being CF$_3$ or a C$_2$-C$_8$-perfluoroalkyl radical or a C$_2$-C$_8$ perfluoroalkyl radical which is interrupted by at least one oxygen atom.

3. The process as claimed in claim 1 wherein the essentially non-crosslinked fluorocarbon polymer used as the starting material in step (a) contains the side-chain end group —CHF$_2$.

4. The process as claimed in claim 2 wherein X is F.

5. The process as claimed in claim 1, wherein reaction stage (a) is carried out using peroxodisulfuryl difluoride which has been obtained electrochemically by electrolyzing fluorosulfonic acid containing alkali metal fluorosulfonates.

6. The process as claimed in claim 1, wherein reaction stage (a) is carried out using electrochemically prepared peroxodisulfuryl difluoride by electrolyzing said non-crosslinked starting fluorocarbon polymer containing the side chain end groups —CHFX, X being F or CF$_3$, in an electrolyte composed of fluorosulfonic acid and an alkali metal fluorosulfonate using platinum, alloys of platinum with metals of the platinum group or vitreous carbon as anode materials and cathode materials which are conventional, but stable under the conditions of electrolysis.

7. A process as claimed in claim 1, wherein R, of ROH and —COOR in said stage (b$_{11}$), is methyl or ethyl.

8. A process as claimed in claim 1, wherein the fluorosulfato derivative side-chain end groups in said stage (b) are reacted with water in the presence of a solvent or a base.

9. An essentially non-crosslinked fluorocarbon polymer in which the linear macromolecules carry side chains containing the end group

in which X is F or CF$_3$; said polymer containing no H atoms except insofar as any side-chain end groups of the formula —CHFX may be present, wherein X is F or CF$_3$.

* * * * *